United States Patent [19]

Asai

[11] Patent Number: 4,788,392
[45] Date of Patent: Nov. 29, 1988

[54] TANK TYPE GAS CIRCUIT BREAKER

[75] Inventor: Yoshihito Asai, Hitachi, Japan

[73] Assignee: Hitachi, Ltd., Tokyo, Japan

[21] Appl. No.: 132,359

[22] Filed: Dec. 14, 1987

[30] Foreign Application Priority Data

Dec. 30, 1986 [JP] Japan ................. 61-311437

[51] Int. Cl.$^4$ ............................. H01H 33/54
[52] U.S. Cl. ..................... 200/148 R; 200/148 A;
200/148 B; 200/148 F
[58] Field of Search .......... 200/148 B, 148 R, 144 B,
200/148 A, 148 F

[56] References Cited

U.S. PATENT DOCUMENTS

| | | | |
|---|---|---|---|
| 4,434,332 | 2/1984 | Yanabu et al. ............... | 200/144 B |
| 4,440,998 | 4/1984 | McConnell et al. ........... | 200/148 R |
| 4,467,158 | 8/1984 | Kobayashi et al. ........... | 200/148 R |
| 4,697,055 | 9/1987 | Walter et al. ................ | 200/148 B |

Primary Examiner—Robert S. Macon
Attorney, Agent, or Firm—Antonelli, Terry & Wands

[57] ABSTRACT

A tank type gas circuit breaker for a three-phase alternating current, comprises: three hollow members spaced in parallel with each other; a single stationary side end plate air-tightly fixed to first ends of the three hollow members; a single mechanism side end plate fixed to second ends of the three hollow members; three stationary contacts each supported to the stationary side end plate and extending in the three hollow members; three movable contacts each supported to the mechanism side end plate and extending in the three hollow members; insulated rods extending in the three hollow members while passing through the mechanism side end plate for interrupting contacts between the movable contacts and the stationary contacts; an operational rotary shaft mechanism disposed adjacent to the mechanism side end plate and connected to the insulated rods for driving each of the insulated rods; an actuator for driving the operational rotary shaft mechanism; two bushing porcelain insulators located on a top surface of each of the hollow members; current transformers arranged in lower sides of the bushing porcelain insulators; conductors disposed within the bushing porcelain insulators and connected to the movable and stationary contacts, and arc-extinction gas filled in the hollow members.

15 Claims, 4 Drawing Sheets

TANK TYPE GAS CIRCUIT BREAKER

BACKGROUND OF THE INVENTION

The present invention relates to a tank type gas circuit breaker, and more particularly to a tank type gas circuit breaker used for a three-phase alternating current.

In a conventional tank type gas circuit breaker, an arc-extinction gas is filled into three tanks that are juxtaposed and spaced in the air for insulation from each other and that incorporate therein interrupter parts for each phase, as shown in FIG. 1 of Japanese Utility Model Unexamined Publication No. 53-32361. In each of the interrupter tanks, there is provided an operational rotary shaft mechanism for driving a movable contact of the interrupter part incorporated within the interrupter tank. A connecting tank is fixedly provided for sealing the operational rotary shaft mechanism. The respective operational rotary shaft mechanisms are connected by operating rods that are connected to an actuator. Support legs are fixed to the respective interrupter tanks and are supported by a base fixed to the ground.

The interruption operation is performed as follows. A drive force produced by the actuator is transmitted to the operating rods, and the operating rods cause the respective operational rotary shaft mechanisms to rotate. Thus, the interrupter parts incorporated in the interrupter tanks are separated relative to each other to thereby complete the interruption operation.

The thus constructed tank type gas circuit breaker for a three-phase alternating current has bushing porcelain insulators that are mounted in parallel with each other. Accordingly, it is impossible to set a distance between the interrupter tanks to a distance less than the air-insulation distance. Thus, the conventional circuit breaker requires a large area for installation. Also, the respective interrupter tanks are independent of each other. Therefore, it is necessary to provide the connecting tank for each phase, which increases the number of the mechanical parts and the cost therefor. Furthermore, it is difficult to adjust the interruption timing between the respective phases. This needs a long period of time.

In contrast to the above-described conventional arrangement, there has been proposed another tank type gas circuit breaker for a three-phase alternating current as shown in FIGS. 2 and 3 of Japanese Utility Model Unexamined Publication No. 53-32361. In this tank type gas circuit breaker, the bushing porcelain insulators are arranged obliquely relative to each other to thereby keep the air insulation distance suitably, whereby the distance between the interrupter tanks for respective phases is reduced. Furthermore, the interrupter tanks are connected at their barrel portions by hollow connecting members. Operating rods are disposed within the hollow connecting members and the respective operational rotary shaft mechanisms are disposed within the respective interrupter tanks. Thus, it is possible to reduce the installation area and to dispense with the connecting tanks for sealingly incorporating the operational rotary shaft mechanisms.

However, since the above-mentioned tank type gas circuit breaker for the three-phase alternating current completes the assembling thereof after the interrupter parts are disposed within the interrupter tanks, performed must be the adjustment of the length of the connecting rods connecting the operational rotary shaft mechanisms and the contacts of the interrupter parts, namely, the adjustment of the interruption timing for the respective phases after the completion of the assembling of the circuit breaker and further within the interrupter tanks. Accordingly, it is necessary to provide a manhole for adjustment in a suitable position of each interrupter tank. Also, since the adjustment is carried out in the tanks, it is difficult to perform the adjustment. In addition, the provision of the operating rotary shaft mechanisms within the interrupter tanks makes the internal structure of each tank complicated. Although such an arrangement enables to dispense with the connecting tanks, it is difficult to reduce the number of the mechanical parts to simplify the structure and to enhance the reliability of the circuit breaker.

SUMMARY OF THE INVENTION

An object of the invention is to provide a tank type gas circuit breaker for a three-phase alternating current which is capable of adjusting the interruption timing for the respective phases before the interrupter parts are received in the interrupter tanks and which has a simple structure including a little parts and high reliability.

According to the present invention, there is provided a tank type gas circuit breaker for a three-phase alternating current, comprising: three hollow members spaced in parallel with each other; a single stationary side end plate air-tightly fixed to first ends of the three hollow members; a single mechanism side end plate fixed to second ends of the three hollow members; three stationary contacts each supported to the stationary side end plate and extending in the three hollow members; three movable contacts each supported to the mechanism side end plate and extending in the three hollow members; insulated rods extending in the three hollow members while passing through the mechanism side end plate for interrupting contacts between the movable contacts and the stationary contacts; an operational rotary shaft mechanism disposed adjacent to the mechanism side end plate and connected to the insulated rods for driving each of the insulated rods; an actuator for driving the operational rotary shaft mechanism; two bushing porcelain insulators located on a top surface of each of the hollow members; current transformers arranged in lower sides of the bushing porcelain insulators; conductors disposed within the bushing porcelain insulators and connected to the movable and stationary contacts, and arc-extinction gas filled in the hollow members.

Preferably, the circuit breaker is supported at the two end plates to a base.

Preferably, the bushing porcelain insulators are obliquely provided in air-insulating distance relation with each other.

It is preferable that the operational rotary shaft mechanism is received in a connection tank fixed to the mechanism side end plate, and a sealing member is disposed at a part where a rotary shaft of the operational rotary shaft mechanism passes through the connecting tank.

It is also preferable that a sealing member is disposed at a part where each of the insulated rods passes through the mechanism side end plate.

According to another aspect of the present invention, there is provided a tank type gas circuit for a three-phase alternating current, comprising: three interrupter tanks spaced in parallel with each other, the three interrupter tanks being defined by three barrel portions, a single stationary side end plate and a single mechanism side end plate; three stationary contacts each supported to the stationary side end plate and extending in the three interrupter tanks; three movable contacts each supported to the mechanism side end plate and extending in the three interrupter tanks; insulated rods extending in the three interrupter tanks while passing through the mechanism side end plate for interrupting contact between the movable contacts and the stationary contacts; an operational rotary shaft mechanism disposed adjacent to the mechanism side end plate and connected to the insulated rods for driving each of the insulated rods; an actuator for driving the operational rotary shaft mechanism; two bushing porcelain insulators provided for each phase, the bushing porcelain insulators being located on a top surface of each of the interruption tanks; current transformers each arranged in a lower side of each of the bushing porcelain insulators; conductors disposed within the bushing porcelain insulators and connected to the movable contacts and the stationary contacts; and arc-extinction gas filled in the interrupter tanks.

According to still another aspect of the present invention, there is provided a tank type gas circuit breaker for a three-phase alternating current, comprising: a pair of end plates spaced from each other; three enclosures spaced from each other and disposed in parallel with each other between the pair of end plates; three stationary contacts each supported to one of the pair of end plates and extending in the three enclosures; three movable contacts each supported to the other of the pair of end plates and extending in the three enclosures; insulated rods extending in the three enclosures while passing through the other of the pair of end plates for interrupting contact between the movable contacts and the stationary contacts; an operational rotary shaft mechanism disposed adjacent to said other of pair of end plates and connected to the insulated rods for driving each of the insulated rods; an actuator for driving the operational rotary shaft mechanism; two bushing porcelain insulators provided for each phase, the bushing porcelain insulators being located on a top surface of each of the enclosures; current transformers each arranged in a lower side of each of the bushing porcelain insulators; conductors disposed within the bushing porcelain insulators and connected to the movable contacts and the stationary contacts; and arc-extinction gas filled in the enclosures.

DETAILED DESCRIPTION OF THE PREFERRED EMBODIMENTS

Figure 1:
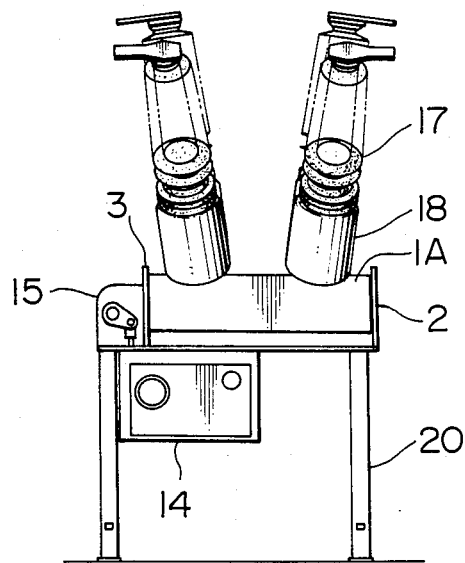
FIG. 1 is a front view showing a first embodiment of a tank type gas circuit breaker for a three-phase alternating current in accordance with the invention.
Figure 2:
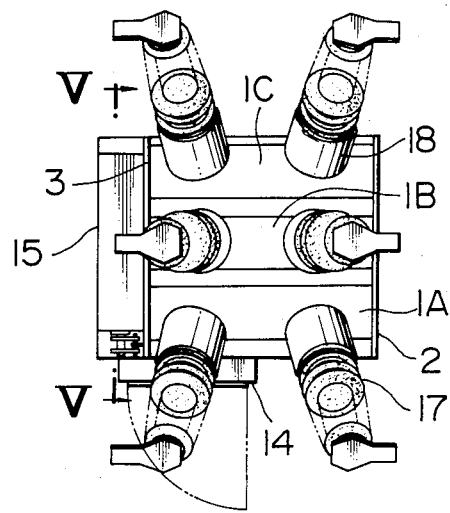
FIG. 2 is a plan view of the first embodiment shown in FIG. 1.
Figure 3:
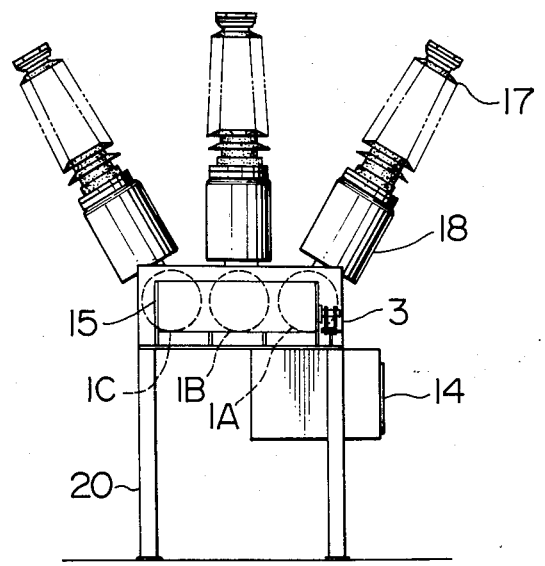
FIG. 3 is a left side elevational view of the first embodiment shown in FIG. 1.
Figure 5:
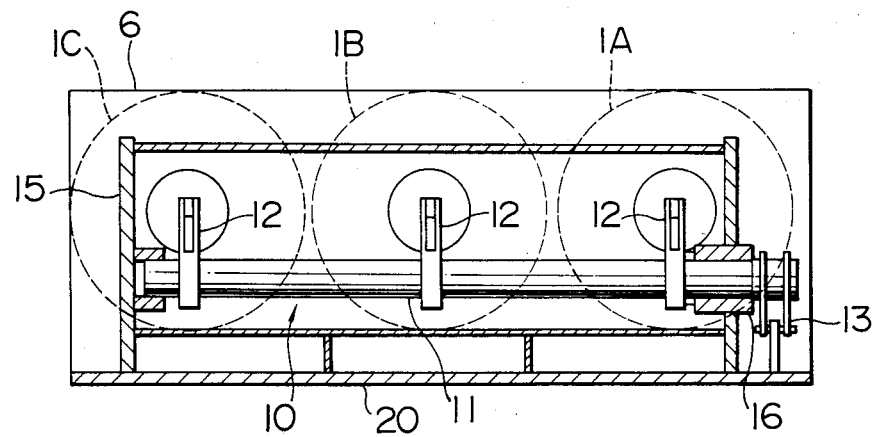
FIG. 5 is a partial cross-sectional view showing the connecting tank and the operational rotary shaft mechanism used in the first embodiment.
Figure 4:
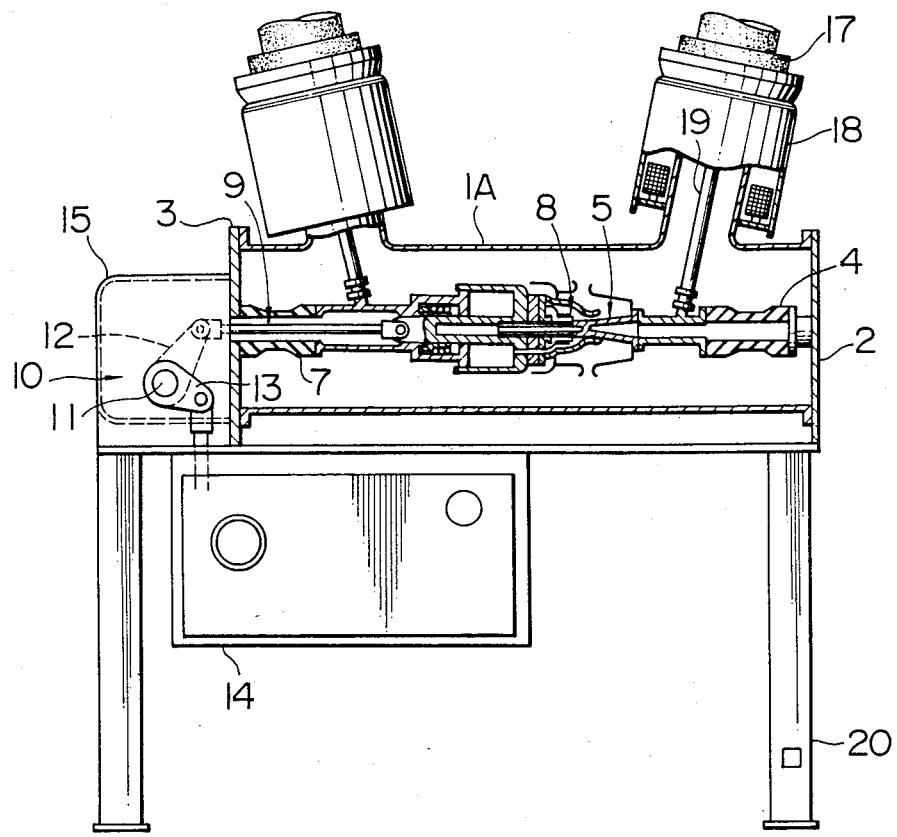
FIG. 4 is a partial, cross-sectional front view of the first embodiment shown in FIG. 1.

A first embodiment of a tank type gas circuit breaker for a three-phase alternating current in accordance with the present invention will now be described with reference to FIGS. 1 through 5.

Reference characters 1A, 1B and 1C indicate hollow members receiving therein interrupter parts for respective phases A, B and C. The hollow members 1A, 1B and 1C are arranged in parallel with each other in a spaced relation. A common stationary side end plate 2 is air-tightly fixed to first ends of the three hollow members 1A, 1B and 1C by fastening means such as bolts (not shown). Similarly, a mechanism side common end plate 3 is air-tightly fixed to second ends of the hollow members 1A, 1B and 1C. Three interrupter tanks are formed by the hollow members 1A, 1B and 1C, the stationary side end plate 2 and the mechanism side end plate 3. A stationary contact 5 is mounted through an insulating support sleeve or cylinder 4 on the stationary side end plate 2 and is disposed within each of the hollow members 1A, 1B and 1C. A movable contact 8 is mounted through an insulating support sleeve or cylinder 7 on the mechanism side end plate 3 and is disposed within each of the hollow members 1A, 1B and 1C with its one end being engaged with the stationary contact 5. The other end of the movable contact 8 is connected to an insulated rod 9. An end portion of the insulated rod 9 extends through the mechanism side end plate 3 to the outside of the interrupter tank. An operational rotary shaft mechanism 10 is provided outside and adjacent to the mechanism side end plate 3. The operational rotary shaft mechanism 10 includes a rotary shaft 11 extending across the extension direction of the interrupter tank, a lever 12 fixed to a corresponding position of each interrupter tank, and a link 13 fixed to the end portion of the rotary shaft 11. An end portion of each insulated rod 9 is connected to an end portion of each lever 12, and an end portion of the link 13 is connected to an actuator 14. Parts other than the end portion of the operating rotary shaft 11 of the operational rotary shaft mechanism 10 and the mechanism side end plate 3 are received within a connecting tank 15 with the end portion of the operating rotary shaft 11 extending through the connecting tank 15. Namely, the link 13 is provided outside the connecting tank 15. A sealing member 16 is provided at a portion where the operating rotary shaft 11 passes through the connecting tank 15.

Two bushing porcelain insulators 17 extending upwardly for each phase current are provided on a top surface of each of the hollow members 1A, 1B and 1C. The bushing porcelain insulators 17 are disposed obliquely with a spaced insulation distance in the air from each other. A current transformer 18 is provided at a lower side of each of the bushing porcelain insulators 17. A conductor 19 is received in each bushing porcelain insulator 17. The two conductors 19 for each phase current are connected to the stationary contact 5 and the movable contact 8, respectively. An arc-extinction gas such as $SF_6$ gas is filled in the connecting tank 15 and the interrupter tank.

The thus constructed circuit breaker is supported on a base 20 fixed to the ground through the stationary side end plate 2 and the mechanism side end plate 3.

The operational will now be described.

When the actuator 14 is operated, a link 13 of the operational rotary shaft mechanism 10 is rotated, the operating rotary shaft 11 is rotated and the levers 12 fixed to the operating rotary shaft 11 are rotated. When the levers 12 are rotated, the three insulated rods 9 are driven, so that the movable contacts 8 are moved. In accordance with this operation, the engagement between the movable contact 8 and the stationary contact 5 is released. At this time, an arc is generated between the movable contact and the stationary contact but the arc is extinguished by the arc-extinction gas filled in the interrupter tank, thereby completing the interruption. When the actuator 14 is returned to its original position, the movable contact 8 is returned back to the original position and is again brought into contact with the stationary contact 5, thereby providing an electrical connection between the contacts.

The assembling steps of the above-described circuit breaker will be described.

First of all, the stationary contact 5 for each phase current is mounted on the stationary side end plate 2 through the insulating support sleeve or cylinder 4. Subsequently, the movable contact 8 for each phase current is mounted on the mechanism side end plate 3 through the insulating support sleeve or cylinder 7. The operational rotary shaft mechanism 10 is connected to the end of each insulated rod 9. Under such a condition, a temporary assembling is performed on a jig having a length corresponding to a length of each of the hollow members 1A, 1B and 1C, to thereby adjust the interruption timings between the phases. After the adjustment of the interruption timings between the phases has been accomplished, the stationary side end plate 2 on which each stationary contact 5 is mounted is placed at the first ends of the three hollow members 1A, 1B and 1C. Then, the stationary side end plate 2 is air-tightly fixed to the hollow members 1A, 1B and 1C by fastening means (not shown). Subsequently, the mechanism side end plate 3 on which the movable contacts 8 for the respective phases are mounted is placed at the second ends of the hollow members 1A, 1B and 1C, and similarly is air-tightly fixed to the hollow members 1A, 1B and 1C by the fastening means (not shown). Subsequently, the connecting tank 15 is air-tightly fixed to the mechanism side end plate 3 so as to seal the operational rotary shaft mechanism 10 and the actuator 14 is connected to the link 13. The conductors 19 are connected to the stationary contacts 5 and the movable contacts 8, and the current transformers 18 and the bushing porcelain insulators 17 are fixed to the respective hollow members 1A, 1B and 1C. The circuit breaker is mounted on the base 20 with the stationary side end plate 2 and the mechanism side end plate 3.

As described above, in the three-phase current tank type gas circuit breaker in accordance with the above-described embodiment, since the stationary contact for each phase is fixed to the common stationary side end plate 2, and the movable contact 8 for each phase is mounted on the common mechanism side end plate 3, it is possible to perform the interruption timing adjustment for the respective phases outside the tank before the completion of the circuit breaker. As a result, it is easy to perform the adjustment. Furthermore, since the operational rotary shaft mechanism 10 is provided outside and adjacent to the mechanism side end plate 3, it is possible to avoid a complicated structure for the internal mechanism of the interrupter tank. Also, since the interrupter tanks for the respective phases are in communication with each other by the parts through which the insulated rods 9 pass and by the connecting tank 15, it is possible to dispense with a gas piping system between the interrupter tanks. At the same time, since the parts through which the mechanical components pass are limited only to the portions at which the operating rotary shaft 11 of the operational rotary shaft mechanism 10 penetrates the connecting tank 15, it is possible to suppress a risk of gas leakage. Moreover, since the circuit breaker is mounted on the base by both end plates, it is possible to dispense with legs for supporting the interrupter tank on the base. Also, since the six bushing porcelain insulators 17 are obliquely arranged in air insulating spaced relation with each other, it is possible to reduce an area which is needed for installing the circuit breaker.

Figure 6:
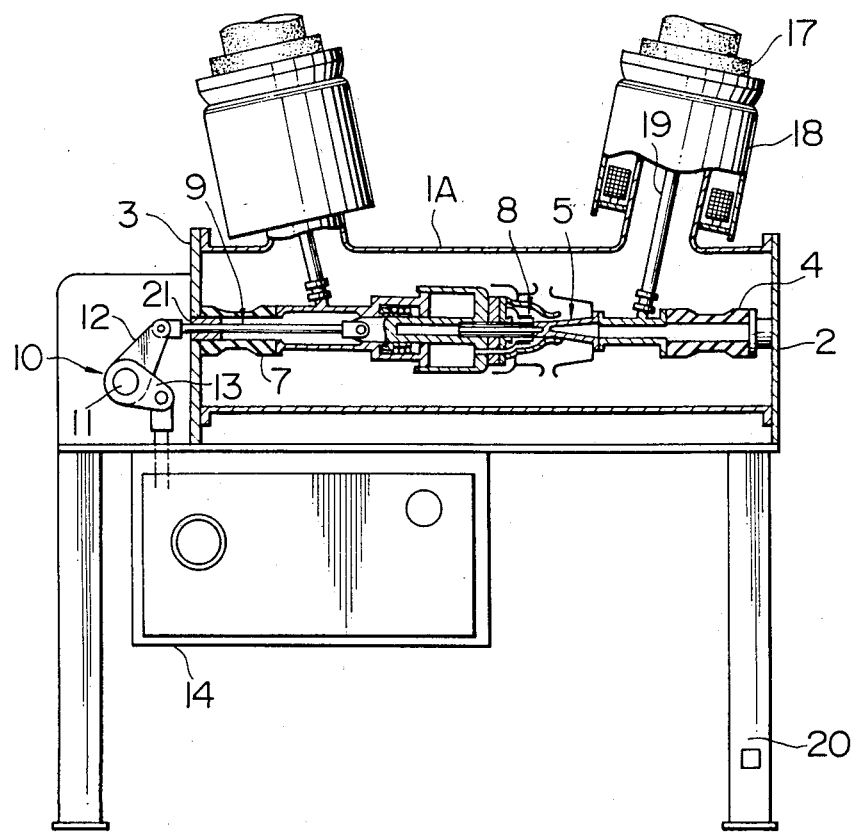
FIG. 6 is a partial cross-sectional and front view showing a second embodiment of a tank type gas circuit breaker for a three-phase alternating current in accordance with the invention.

FIG. 6 shows a second embodiment of a tank type gas circuit breaker for three-phase currents in accordance with the present invention. In the second embodiment, a sealing member 21 is provided at a portion at which each insulated rod 9 penetrates the mechanism side end plate 3, and the operational rotary shaft mechanism 10 is exposed in the atmosphere while being connected to the actuator 14.

In the second embodiment, although the number of the parts to be sealed is increased to three in comparison with the first embodiment and it is necessary to provide a gas piping system between the respective interrupter tanks, it is possible to dispense with the connecting tank 15. Also, the arrangement of the second embodiment is more available in the case where the circuit breaker is large in size and hence the capacity of the connecting tank for sealing the operational rotary shaft mechanism becomes large, since the connecting tank 15 may be dispensed with.

What is claimed is:

1. A tank type gas circuit breaker for a three-phase alternating current, comprising:
   three hollow members spaced in parallel with each other;
   a single stationary side end plate air-tightly fixed to first ends of said three hollow members;
   a single mechanism side end plate fixed to second ends of said three hollow members;
   three stationary contacts each supported to said stationary side end plate and extending in said three hollow members;
   three movable contacts each supported to said mechanism side end plate and extending in said three hollow members;
   insulated rods extending in said three hollow members while passing through said mechanism side end plate for interrupting contacts between said movable contacts and said stationary contacts;
   an operational rotary shaft mechanism disposed adjacent to said mechanism side end plate and connected to said insulated rods for driving each of said insulated rods;
   an actuator for driving said operational rotary shaft mechanism;
   two bushing porcelain insulators provided for each phase, said bushing porcelain insulators being located on a top surface of each of said hollow members;
   current transformers each arranged in a lower side of each of said bushing porcelain insulators;
   conductors disposed within said bushing porcelain insulators and connected to said movable contacts and said stationary contacts; and
   arc-extinction gas filled in said hollow members.

2. The circuit breaker according to claim 1, wherein said circuit breaker is supported at said two end plates to a base.

3. The circuit breaker according to claim 1, wherein said bushing porcelain insulators are obliquely provided in air-insulating distance relation with each other.

4. The circuit breaker according to claim 1, wherein said operational rotary shaft mechanism is received in a connecting tank fixed to said mechanism side end plate, and a sealing member is disposed at a portion where a rotary shaft of said operational rotary shaft mechanism passes through said connecting tank.

5. The circuit breaker according to claim 1, wherein a sealing member is disposed at a portion where each of said insulated rods passes through said mechanism side end plate.

6. A tank type gas circuit breaker for a three-phase alternating current, comprising:
   three interrupter tanks spaced in parallel with each other, said three interrupter tanks being defined by three barrel portions, a single stationary side end plate and a single mechanism side end plate;
   three stationary contacts each supported to said stationary side end plate and extending in said three interrupter tanks;
   three movable contacts each supported to said mechanism side end plate and extending in said three interrupter tanks;
   insulated rods extending in said three interrupter tanks while passing through said mechanism side end plate for interrupting contacts between said movable contacts and said stationary contacts;
   an operational rotary shaft mechanism disposed adjacent to said mechanism side end plate and connected to said insulated rods for driving each of said insulated rods;
   an actuator for driving said operational rotary shaft mechanism;
   two bushing porcelain insulators provided for each phase, said bushing porcelain insulators being located on a top surface of each of said interrupter tanks;
   current transformers each arranged in a lower side of each of said bushing porcelain insulators;
   conductors disposed within said bushing porcelain insulators and connected to said movable contacts and said stationary contacts; and
   arc-extinction gas filled in said interrupter tanks.

7. The circuit breaker according to claim 6, wherein said circuit breaker is supported at said two end plates to a base.

8. The circuit breaker according to claim 6, wherein said bushing porcelain insulators are obliquely provided in air-insulating distance relation with each other.

9. The circuit breaker according to claim 6, wherein said operational rotary shaft mechanism is received in a connecting tank fixed to said mechanism side end plate, and a sealing member is disposed at a portion where a rotary shaft of said operational rotary shaft mechanism passes through said connecting tank.

10. The circuit breaker according to claim 6, wherein a sealing member is disposed at a portion where each of said insulated rods passes through said mechanism side end plate.

11. A tank type gas circuit breaker for a three-phase alternating current, comprising:
    a pair of end plates spaced from each other;
    three enclosures spaced from each other and disposed in parallel with each other between said pair of end plates;
    three stationary contacts each supported to one of said pair of end plates and extending in said three enclosures;
    three movable contacts each supported to the other of said pair of end plates and extending in said three enclosures;
    insulated rods extending in said three enclosures while passing through said other of said pair of end plates for interrupting contacts between said movable contacts and said stationary contacts;
    an operational rotary shaft mechanism disposed adjacent to said other of said pair of end plates and connected to said insulated rods for driving each of said insulated rods;
    an actuator for driving said operational rotary shaft mechanism;
    two bushing porcelain insulators provided for each phase, said bushing porcelain insulators being located on a top surface of each of said enclosures;
    current transformers each arranged in a lower side of each of said bushing porcelain insulators;
    conductors disposed within said bushing porcelain insulators and connected to said movable contacts and said stationary contacts; and
    arc-extinction gas filled in said enclosures;

12. The circuit breaker according to claim 11, wherein said circuit breaker is supported at said pair of end plates to a base.

13. The circuit breaker according to claim 11, wherein said bushing porcelain insulators are obliquely provided in air-insulating distance relation with each other.

14. The circuit breaker according to claim 11, wherein said operational rotary shaft mechanism is received in a connecting tank fixed to said other of said pair of end plates, and a sealing member is disposed at a portion where a rotary shaft of said operational rotary shaft mechanism passes through said connecting tank.

15. The circuit breaker according to claim 11, wherein a sealing member is disposed at a portion where each of said insulated rods passes through said other of said pair of end plates.

* * * * *